United States Patent [19]

Georgiyevskiy

[11] Patent Number: 5,675,304
[45] Date of Patent: Oct. 7, 1997

[54] MAGNET STRUCTURE AND METHOD OF OPERATION

[75] Inventor: Alexsandr V. Georgiyevskiy, Rego Park, N.Y.

[73] Assignee: Raytheon Engineers & Constructors, New York, N.Y.

[21] Appl. No.: 507,620

[22] Filed: Jul. 26, 1995

[51] Int. Cl.$^6$ .................................................. H01K 5/00
[52] U.S. Cl. ........................ 335/299; 336/229; 376/133; 376/142
[58] Field of Search .................................. 335/216, 299; 336/229; 376/121, 133, 137, 142

[56] References Cited

U.S. PATENT DOCUMENTS 4,920,095  4/1990  Ishigaki et al. ........................... 505/1

Primary Examiner—Michael L. Gellner
Assistant Examiner—Raymond M. Barrera
Attorney, Agent, or Firm—Pennie & Edmonds LLP

[57] ABSTRACT

A novel method and apparatus are described for modifying the field within the toroidal chamber of a stellarator or a tokamak. At least one additional electrical conductor is arranged around the straight axis of the toroidal chamber and has a sawtooth or zigzag shape with the number of teeth being the same as the number of toroidal field coils or a factor thereof. The conductor is shaped so that one edge of each tooth is substantially parallel to a portion of one of the toroidal field coils while the other edge of the tooth extends from the upper portion of one coil to a lower portion of the toroidal field coil associated with another tooth. The conductor is adapted to carry a current that is approximately the same as that in the toroidal field coil but in the opposite direction. As a result of this arrangement, magnetic effects can be achieved within the toroidal chamber that are approximately the same as would be created by a helical current flow around the toroidal chamber as in a torsatron or by a twisted toroidal field coil.

44 Claims, 16 Drawing Sheets

FIG. 11A
FIG. 11B
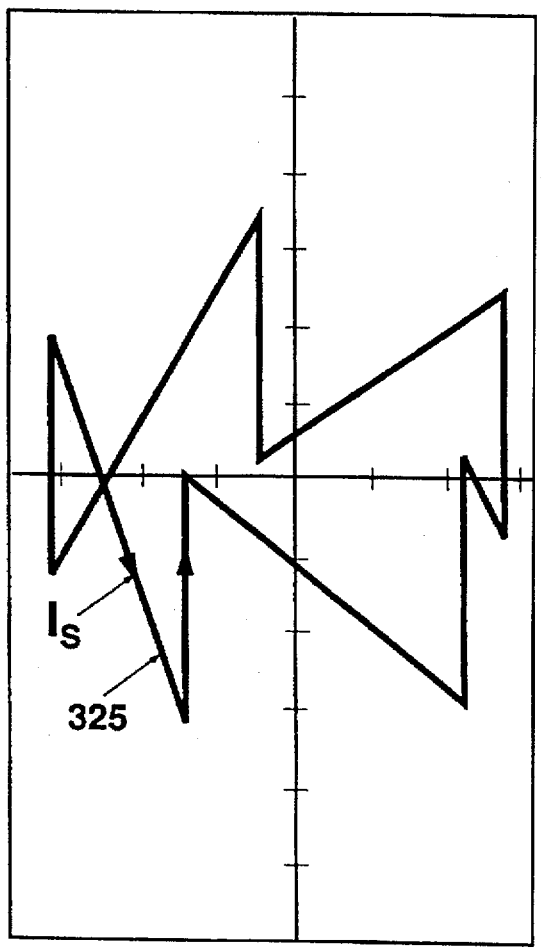
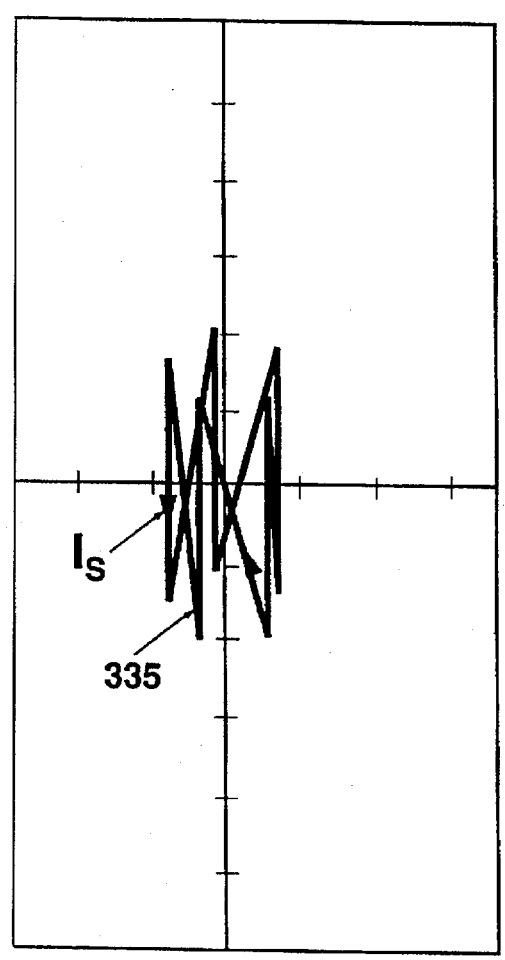

MAGNET STRUCTURE AND METHOD OF OPERATION

FIELD OF THE INVENTION

This relates to toroidal magnets such as those used in tokamaks and stellarators.

BACKGROUND OF THE INVENTION

As shown in the schematic diagram of FIG. 1, a typical prior art tokamak includes a toroidal chamber 10, a plurality of toroidal field coils 20, a plurality of poloidal field coils 30 and a central solenoid 40. The toroidal chamber has a straight axis 12 and a toroidal axis 14. Toroidal axis 14 is a circle running through the center of the toroidal chamber and lying in a plane perpendicular to straight axis 12. Any radius 16 of this circle is referred to as a major radius of the torus. Any radius 18 that extends from toroidal axis 14 to the periphery of toroidal chamber 10 is referred to as a minor radius.

Coils 20 and 30 and solenoid 40 may be superconducting in which case they are cooled to superconducting operating temperatures (about 4° K.) by appropriate magnet coding means 80. Toroidal field coils 20 are mounted at right angles to the toroidal axis and are equally spaced around it. Poloidal field coils 30, as shown, circumscribe the exterior of the rest of the magnet structure. Other arrangements are also used. For example, some or all of coils 30 might be located between the toroidal field coils 20 and chamber 10.

The tokamak also includes one or more ports (not shown) for access to the interior of the toroidal chamber. The toroidal chamber is air-tight and in operation a vacuum on the order of $10^{-7}$ to $10^{-8}$ mmHg is ordinarily maintained within the chamber. A plasma is induced to flow within the toroidal chamber and is confined by a magnetic field established by coils 20 and 30 so that the plasma does not contact the inside walls of the toroidal chamber.

The confining magnetic field is established by a combination of a strong toroidal field indicated by arrow 50 in which the field lines are directed parallel to the toroidal axis and a weaker poloidal field indicated by arrow 60 in which the field lines circle around the toroidal axis. Superposition of the toroidal and poloidal fields results in a helical field indicated by arrow 70. The toroidal field coils 20 establish the toroidal field within the toroidal chamber. The poloidal field is usually generated by an electric current that is induced by solenoid 40 to flow in the plasma. The circulating current also performs the function of heating the plasma.

In a stellarator, the poloidal field is generated by a winding similar to coils 30 around the outer periphery of the toroidal chamber but having a helical pitch. The winding may be a continuous winding or it may be formed from modular coils. This arrangement likewise creates a helical field within the toroidal chamber.

As will be apparent, these magnet structures are quite complicated and it is extremely difficult to modify them so as to change the shape of the magnetic field that they establish within the toroidal chamber. For example, it is known in the art to create magnetic surfaces by tilting the coils about major radii of the torus so that their planes are at an angle to the toroidal axis instead of perpendicular to the axis as shown in FIG. 1. As will be appreciated, however, it is often quite difficult if not impossible to physically tilt the toroidal field coils in toroidal magnets that have already been built.

SUMMARY OF THE INVENTION

I have discovered a novel method and apparatus for modifying the field within the toroidal chamber of a device such as a stellarator or a tokamak. In accordance with the invention, I have added at least one additional electrical conductor to the magnet design. This additional electrical conductor is arranged around the straight axis of the toroidal chamber and has a sawtooth or zigzag shape. Illustratively, the number of teeth is the same as the number of toroidal field coils; and the conductor is shaped so that one edge of each tooth is substantially in the plane of one of the toroidal field coils while the other edge of the tooth extends from the upper portion of the plane of one coil to a lower portion of the plane associated with the next tooth. Other relationships between the number of teeth and the number of field coils may also be used. The conductor is adapted to carry a current that is approximately the same as that in the toroidal field coil but in the opposite direction. As a result of this arrangement, magnetic effects can be achieved within the toroidal chamber that are approximately the same as would be created by a helical current flow around the toroidal chamber or by a twisted toroidal field coil.

BRIEF DESCRIPTION OF THE PREFERRED EMBODIMENT

These and other objects, features and advantages of the invention will be more readily apparent from the following description in which:

FIG. 1 illustrates a prior art toroidal magnet of a tokamak design;

FIG. 2 schematically illustrates a first preferred embodiment of the invention;

FIGS. 11A, 11B and 12 through 14 are schematic illustrations useful in understanding the structure of the embodiment of FIG. 10;

Figure 17:
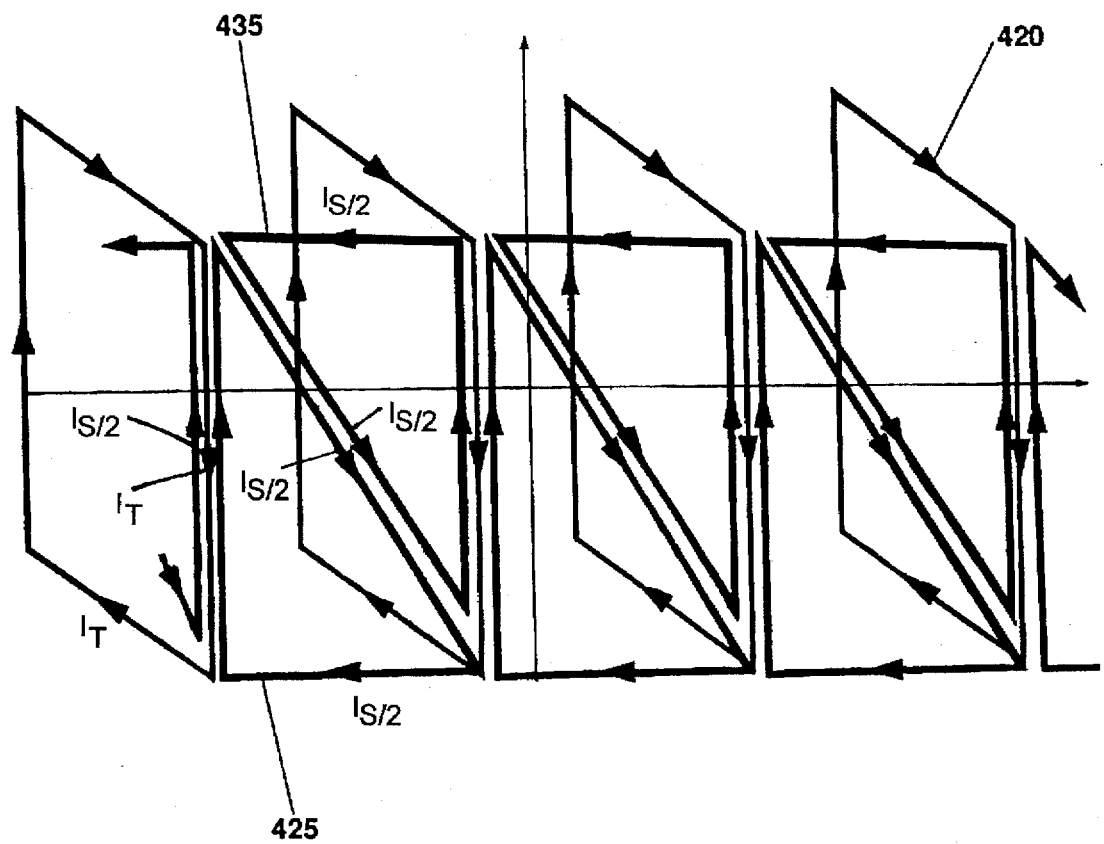
Figure 18:
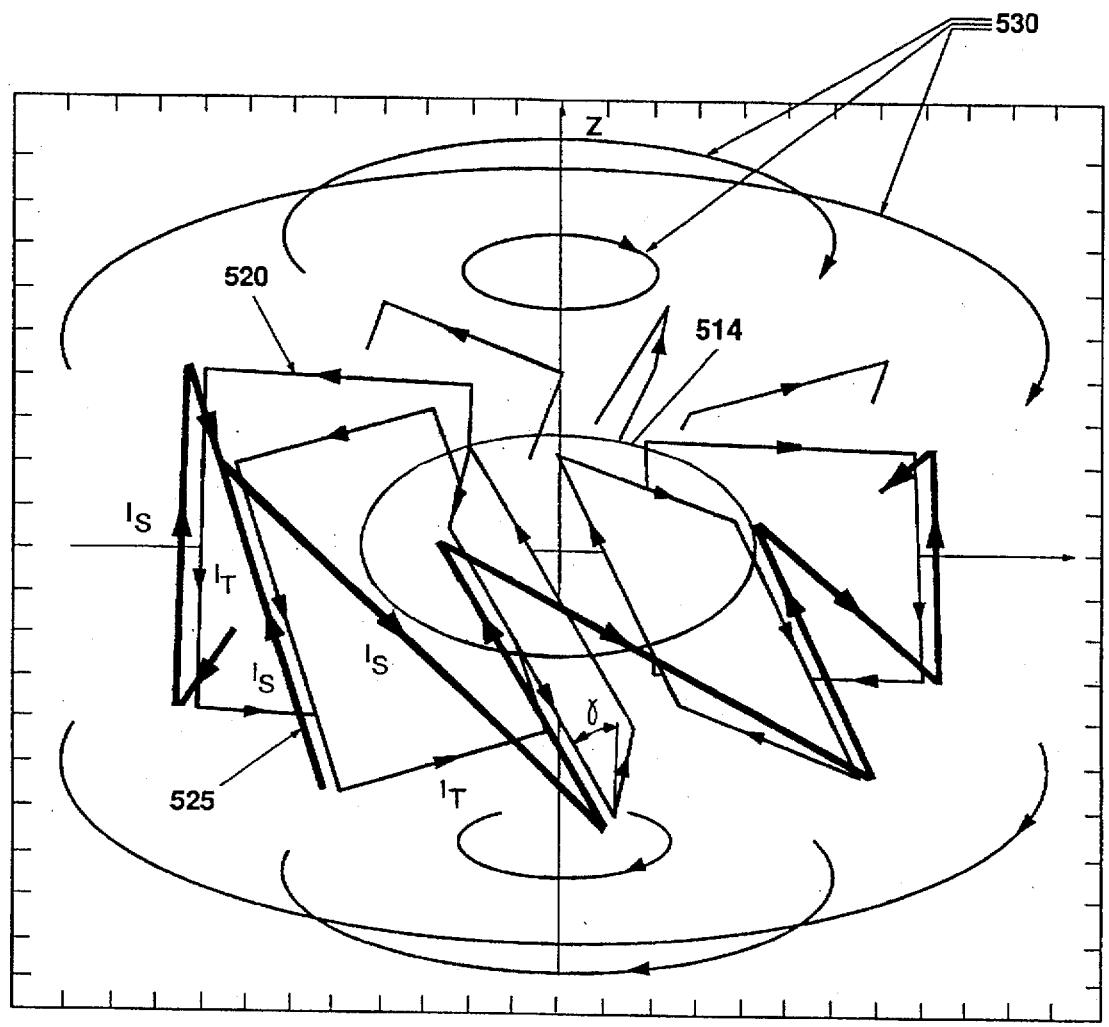
Figure 19:
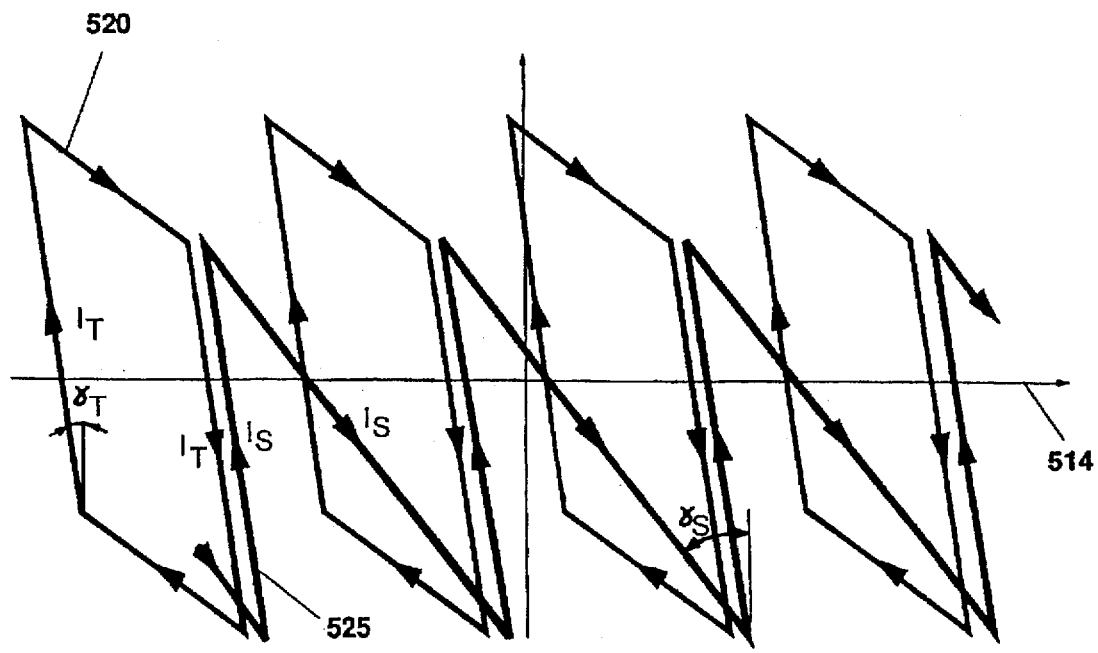
Figure 20:
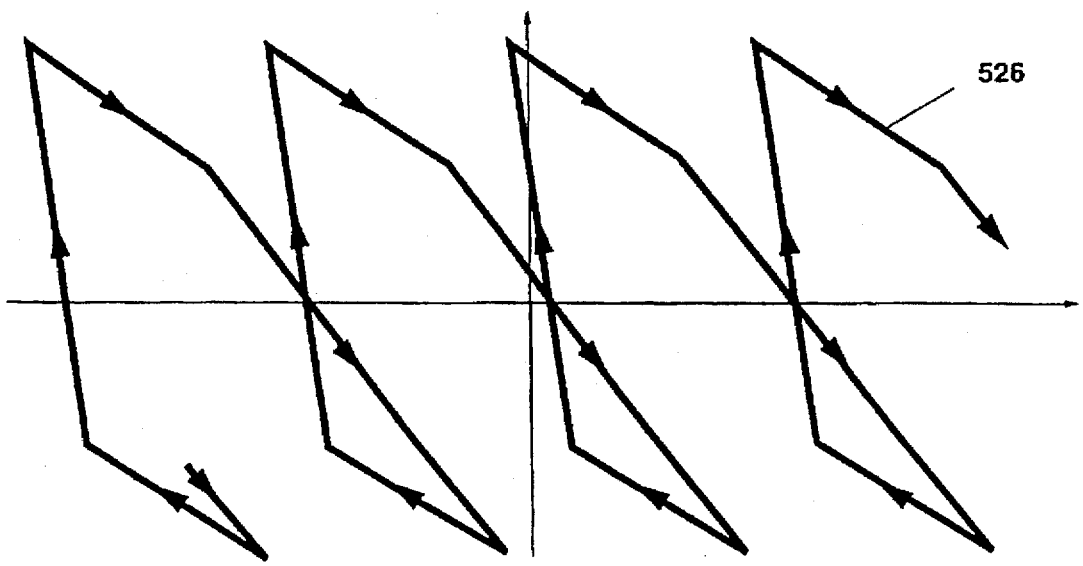
Figure 21:
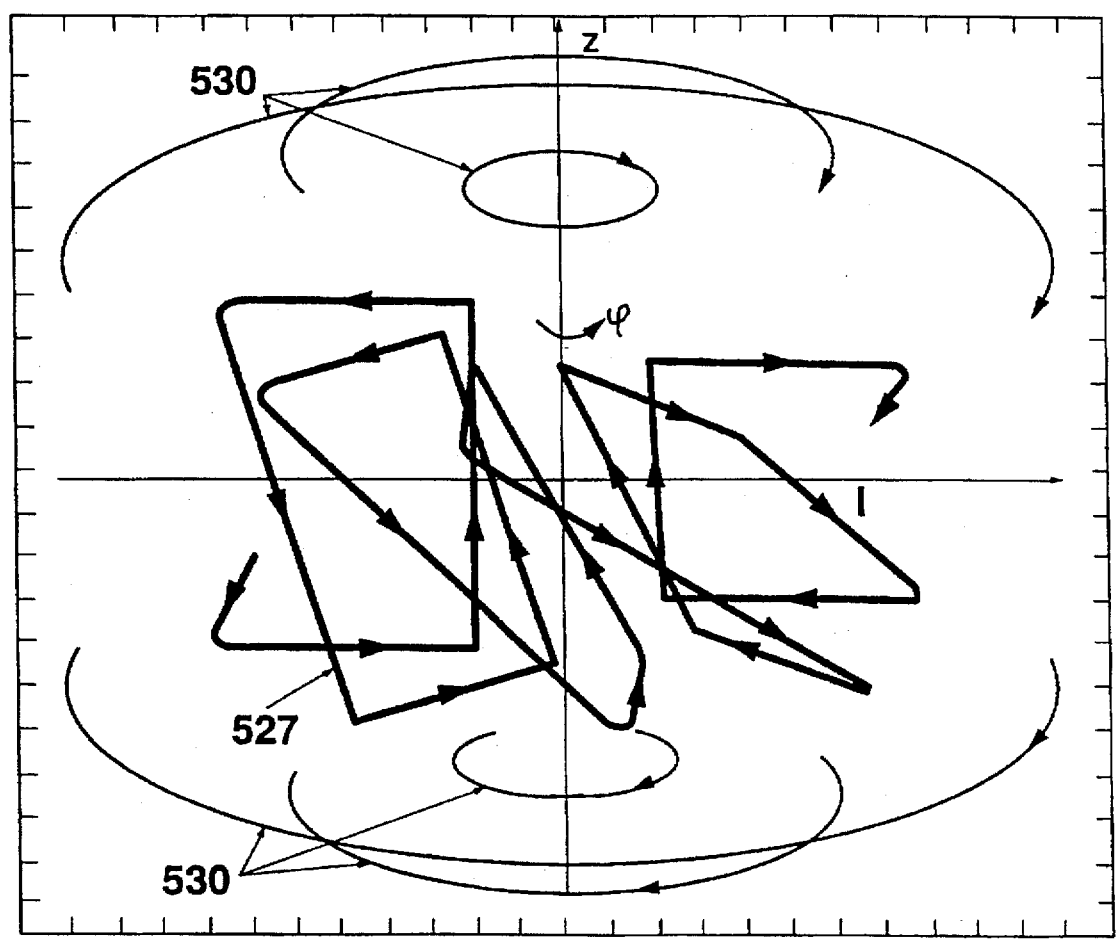

FIG. 17 schematically illustrates a fourth embodiment of the invention;

FIG. 18 schematically illustrates a fifth embodiment of the invention;

FIGS. 19 through 21 are schematic illustrations useful in understanding the structure of the embodiment of FIG. 18.

DETAILED DESCRIPTION OF THE PREFERRED EMBODIMENT

Figure 1:
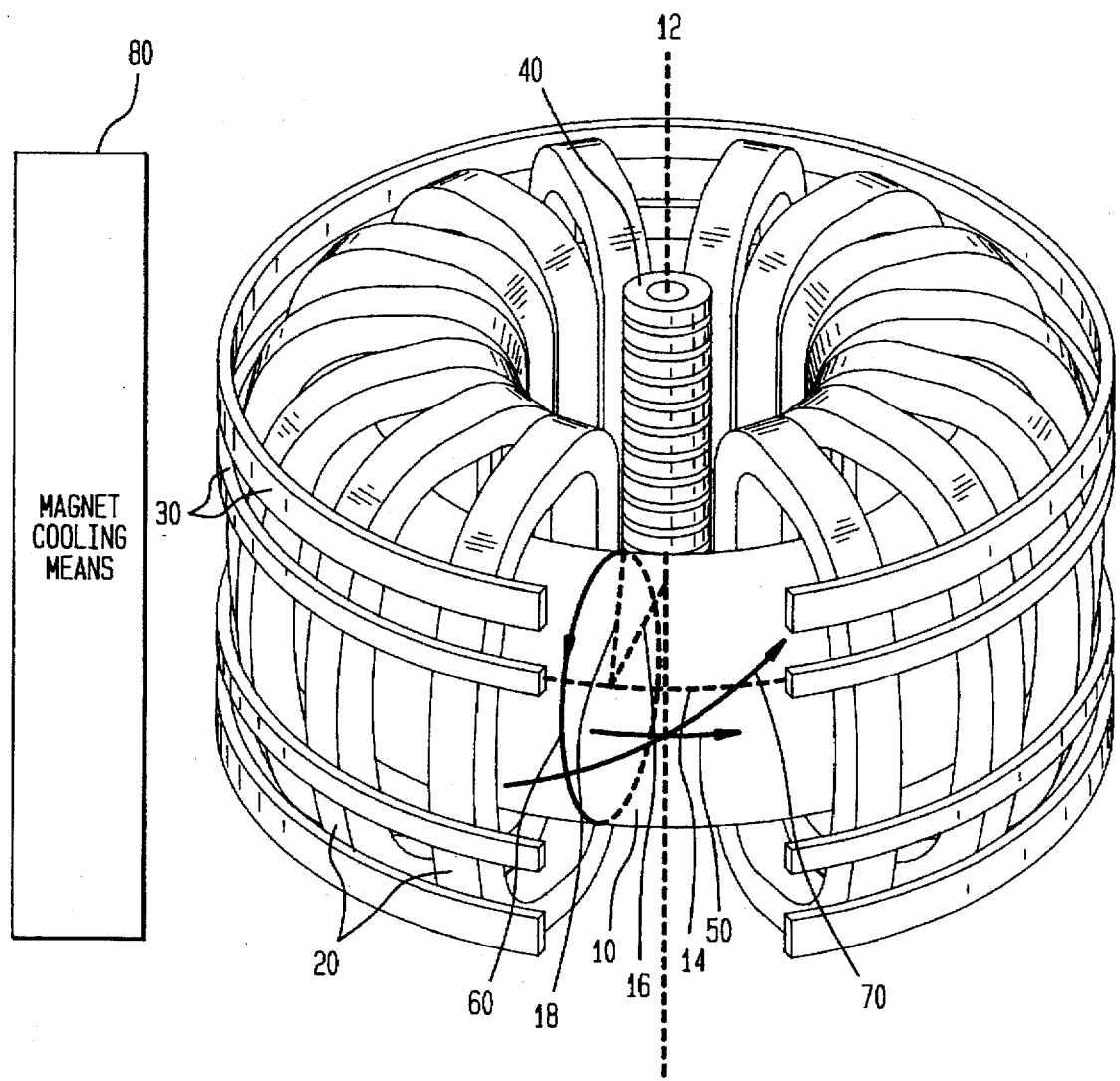

As indicated above, the invention relates to the provision of at least one additional electric conductor for a toroidal magnet. For purposes of describing the invention, it is only necessary to relate this electrical conductor to the toroidal field coils of the magnet. Accordingly, the description of the preferred embodiment will be limited to illustrating the relationship of this electrical conductor to the toroidal field coils. The numerous other elements of the toroidal magnet are conventional and are not set forth in detail so that the description of the invention may be simplified. It will be understood, however, that the invention is used with a magnet having a toroidal chamber, toroidal field coils and poloidal field coils such as those illustrated in FIG. 1.

Figure 2:
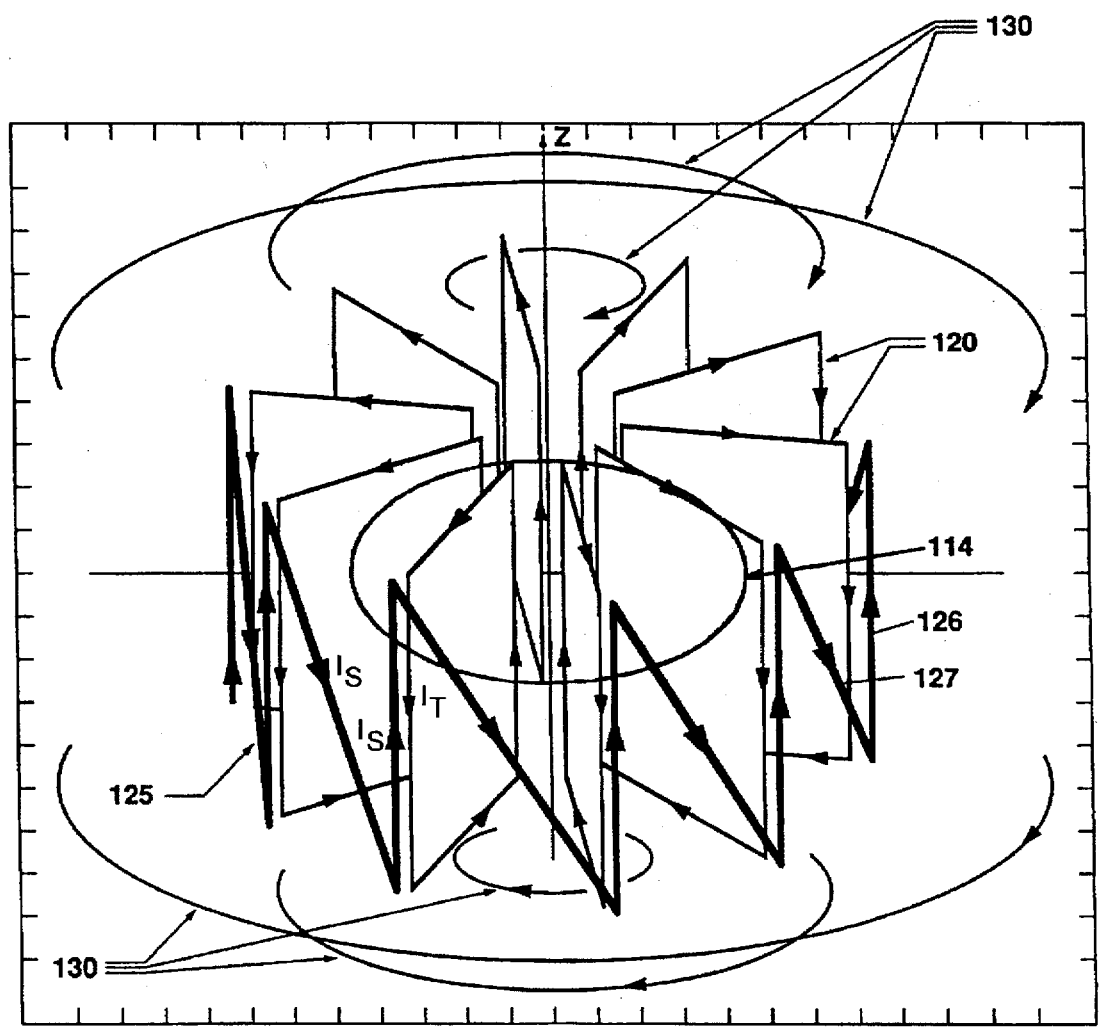

FIG. 2 depicts a plurality of rectangular toroidal field coils 120 which are equally spaced around a toroidal chamber (not shown). The toroidal field coils are arranged at right angles to the toroidal axis 114 of the toroidal chamber. Several poloidal field coils 130 are also illustrated schematically. In accordance with the invention, a zigzag or sawtooth-shaped continuous electric conductor 125 circumscribes the outer periphery of the toroidal field coils 120. Each tooth of the sawtooth-shaped electric conductor 125 includes a first vertical portion 126 extending in parallel along the vertical outside edge of one of the toroidal field coils and a second sloping portion 127 extending from the upper portion of one field coil to the lower portion of the next adjacent field coil.

Figure 3:
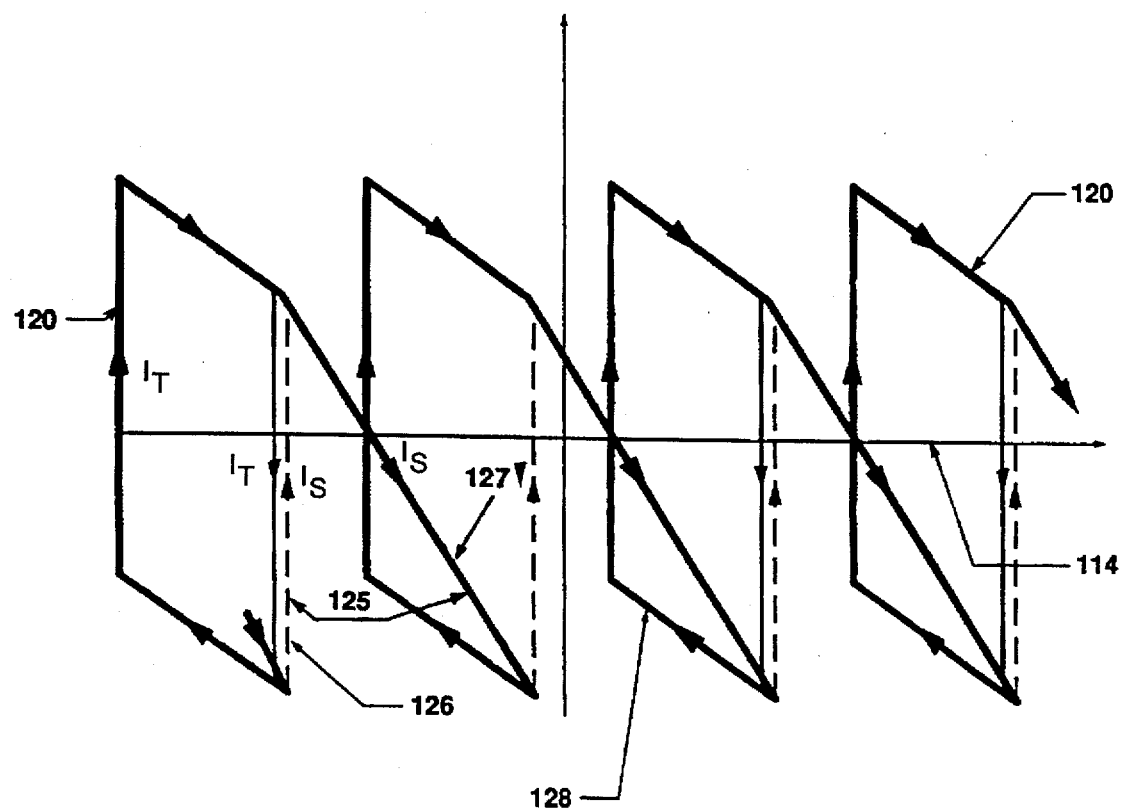
FIGS. 3 and 4 are a schematic illustrations useful in understanding the structure of the embodiment of FIG. 2.

This relationship between the toroidal field coils 120 and the sawtooth-shaped continuous electric conductor is more clearly illustrated in FIG. 3 where the toroidal axis 114 has been transformed from a circle to a straight line.

FIG. 3 depicts the interaction of the electric current $I_T$ flowing in the toroidal field coils 120 with the electric current $I_S$ flowing in the sawtooth-shaped electric conductor 125. As in any tokamak the current flow in all of the toroidal field coils is in the same direction relative to the toroidal axis and is of equal magnitude. In accordance with the invention, the current flow in the sawtooth-shaped continuous electric conductor in the first portion is opposite in direction to the current flow in the edge of the field coil that is parallel to it and is of approximately equal magnitude. As a result, the two equal but oppositely directed currents cancel out each other's effect, producing an effective current flow as indicated by the helical heavy line 128 in FIG. 3.

Figure 4:
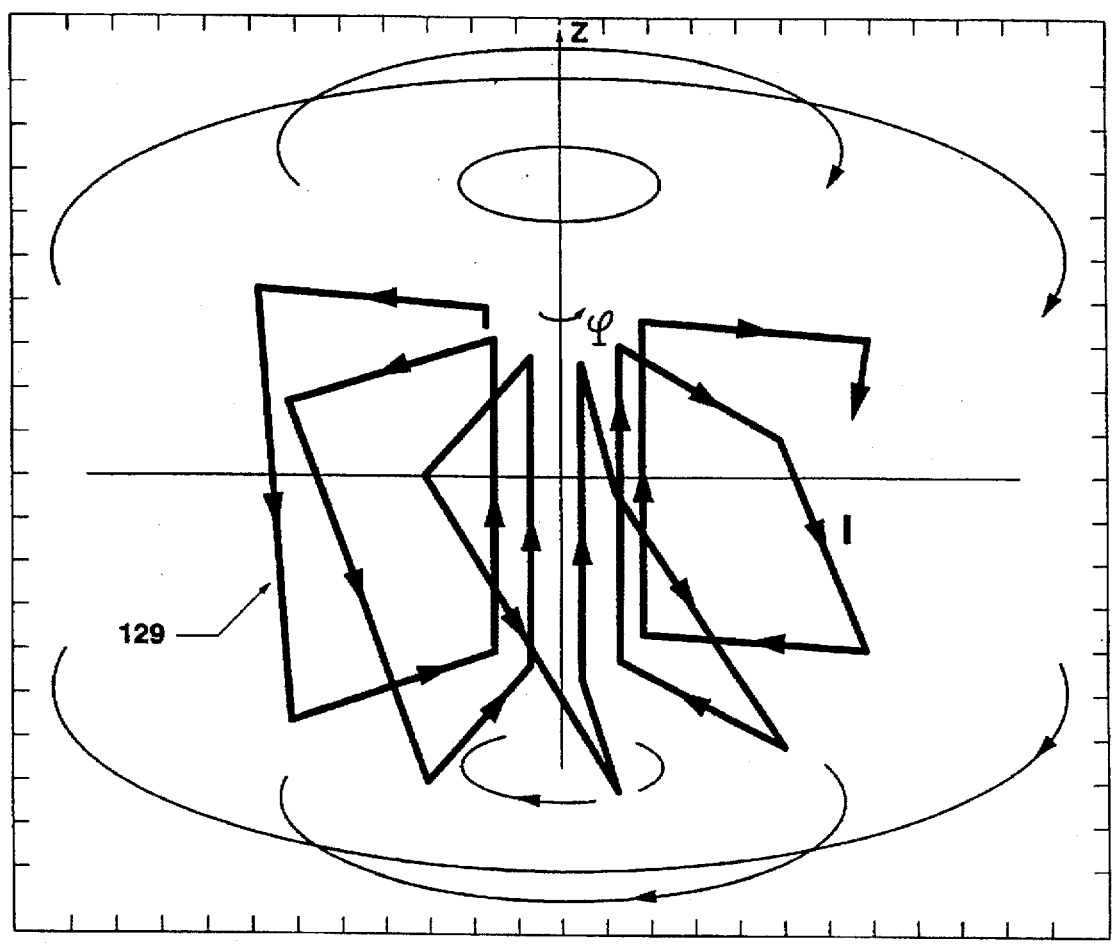

Of course, the toroidal field coils 120 and sawtooth-shaped conductor 125 shown in a straight line in FIG. 3 are in fact mounted on a torus. Thus, the effective current flow is along the path of a helix wrapped around a torus as shown by line 129 in FIG. 4. This path is comparable to the path of the windings in a torsatron.

Figure 5:
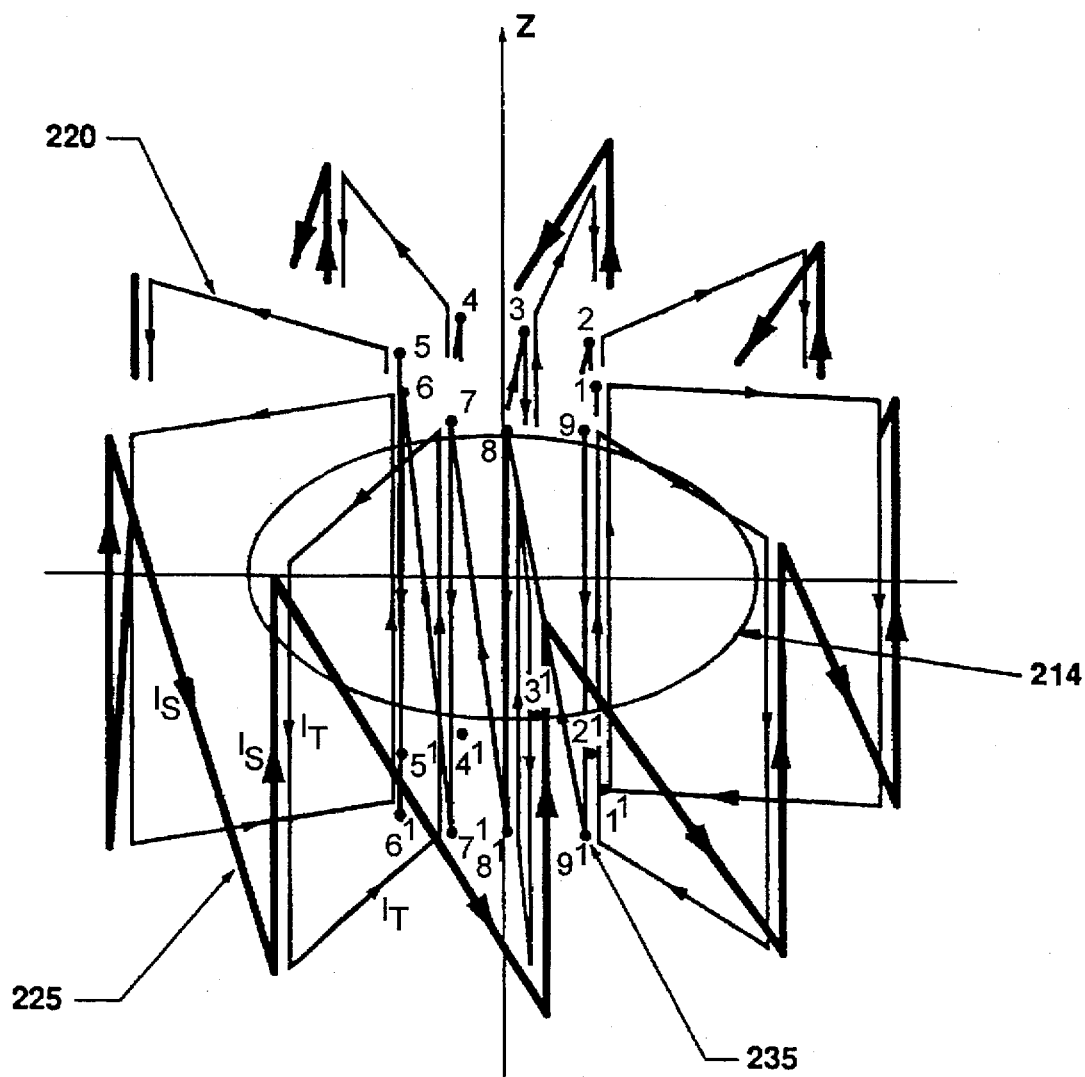
FIG. 5 illustrates a second preferred embodiment of the invention.
Figure 6:
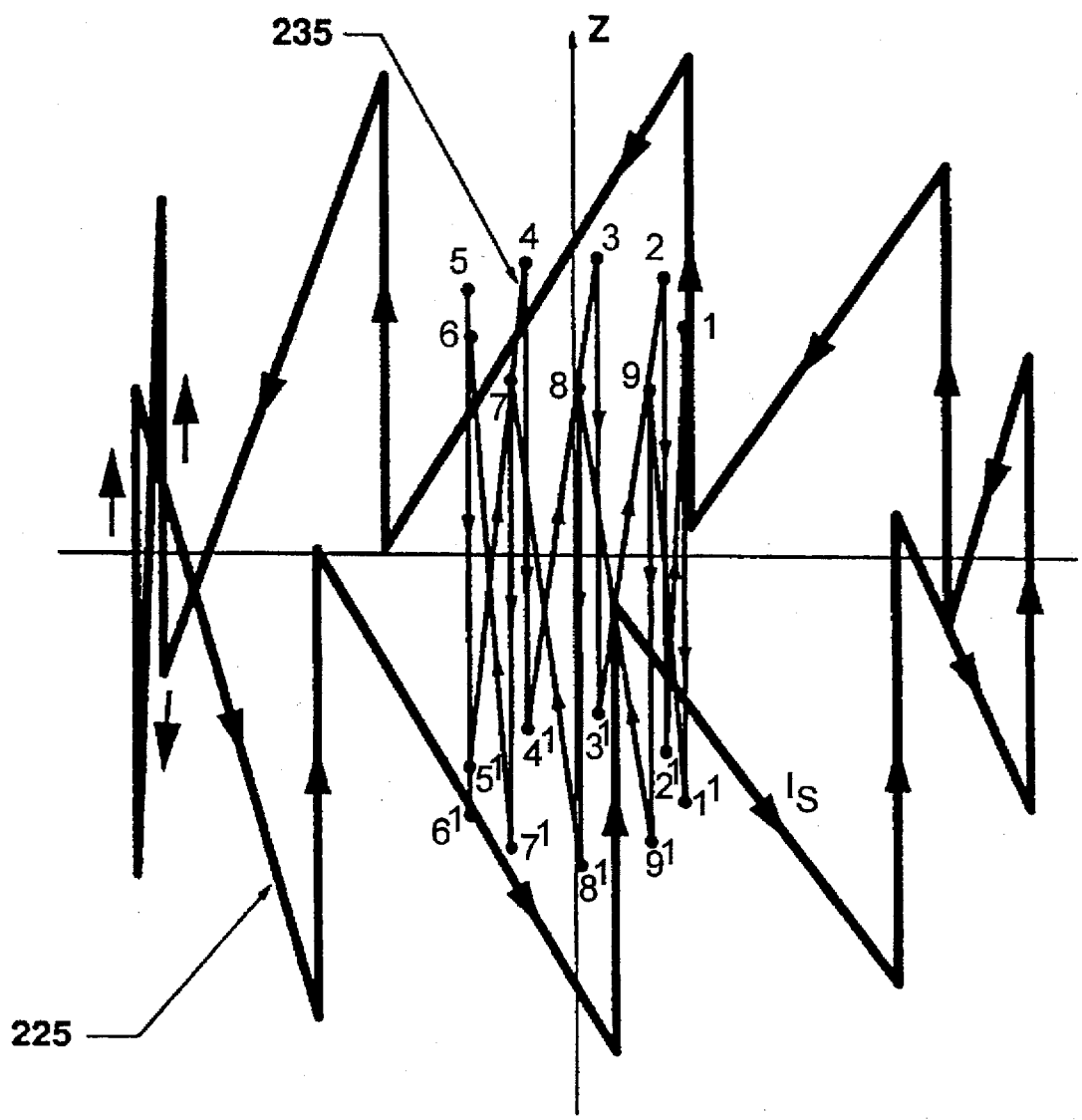
FIGS. 6 through 9 are schematic illustrations useful in understanding the structure of the embodiment of FIG. 5.

FIG. 5 depicts a second embodiment of the invention in which sawtooth-shaped continuous electric conductors 225 and 235 circumscribe both the outer and inner periphery of the toroidal field coils 220. Again, the field coils are arranged at right angles to the toroidal axis 214 of the toroidal chamber. For clarity, FIG. 6 depicts the relationship of the two sawtooth-shaped conductors 225 and 235 on the toroidal chamber with the toroidal field coils removed; and FIG. 7 depicts the relationship between the two sawtooth-shaped conductors 225 and 235 and the toroidal field coils where the toroidal axis 214 has been transformed from a circle to a straight line.

Figure 7:
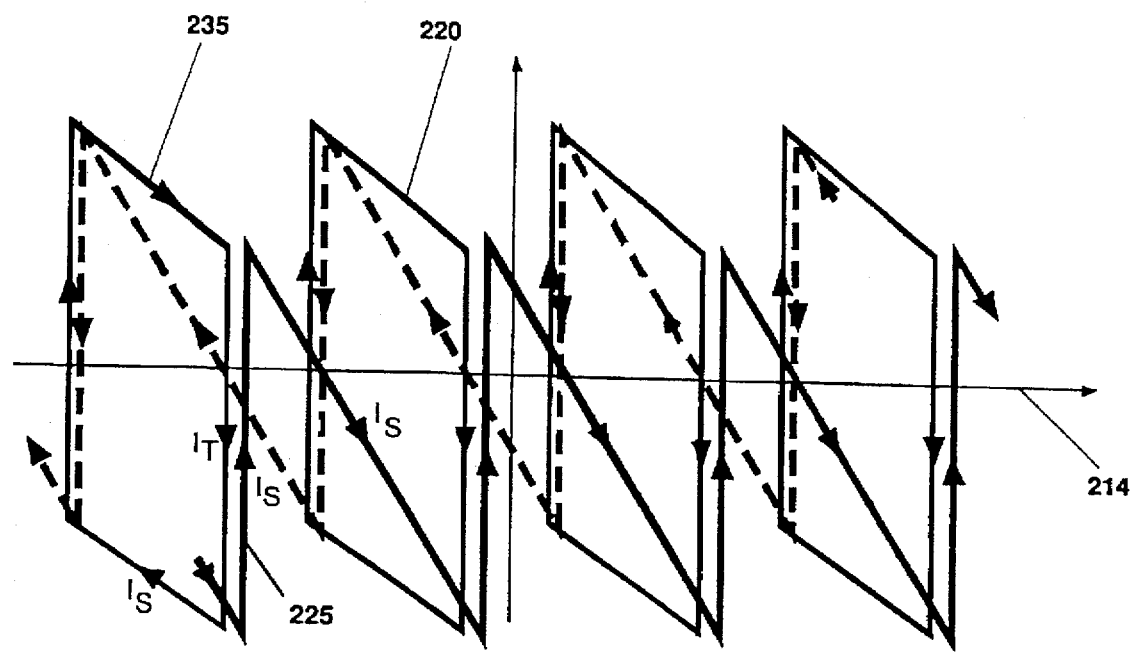

Like FIG. 3, FIG. 7 depicts the interaction of the electric current $I_T$ flowing in the toroidal field coils 220 with the electric currents $I_S$ flowing in sawtooth-shaped electric conductors 225 and 235. For each sawtooth-shaped conductor, a first vertical portion is aligned with and parallel to one edge of a toroidal field coil and a second sloping portion extends from an upper edge of one toroidal field coil to a lower edge of the next toroidal field coil. Moreover, the direction of the slope is the same for both sawtooth-shaped electric conductors.

Figure 8:
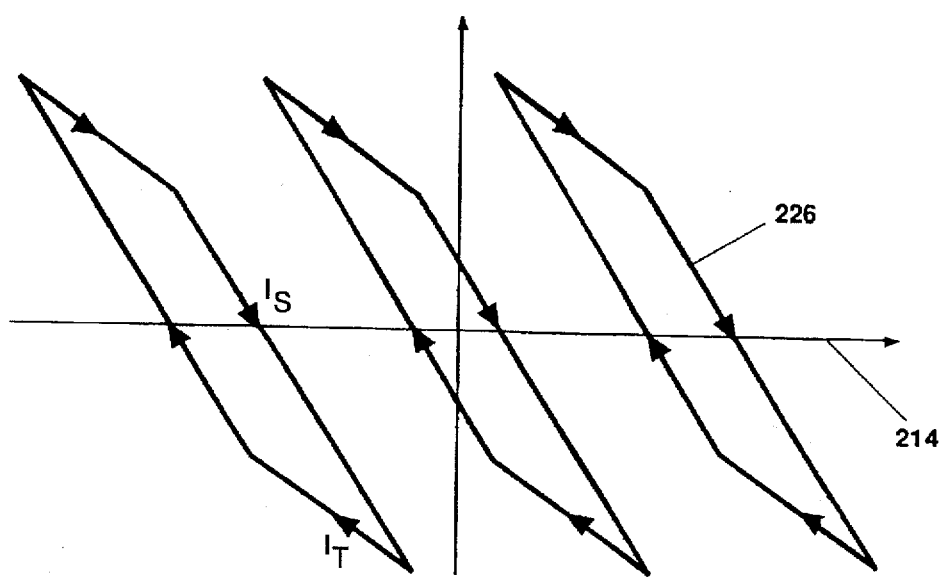

In accordance with the invention, the currents in sawtooth-shaped electric conductors 225 and 235 are equal and opposite. Further, the current flow in each sawtooth-shaped continuous electric conductor in the first portion is opposite in direction to the current flow in the edge of the toroidal field coil that is parallel to it and is of approximately equal magnitude. As a result, the two equal but oppositely directed currents cancel out each other's effect, thereby producing an effective current flow at each pair of adjacent coils that goes across the upper edge of one toroidal field coil, down the sloping portion of the outer sawtooth-shaped conductor, across the lower edge of the next toroidal field coil and up the sloping portion of the inner sawtooth-shaped conductor and back to the point of beginning. The resulting paths are shown as loops 226 in FIG. 8.

Loops 226 will be recognized as the same as the paths of current that would be observed if the toroidal field coils were tilted at the same angle as the sloping portion of the sawtooth-shaped electric conductor. Thus, the embodiment of FIG. 5 provides a means of producing the effects of magnetic surfaces without having to tilt the toroidal field coils at all.

Figure 9:
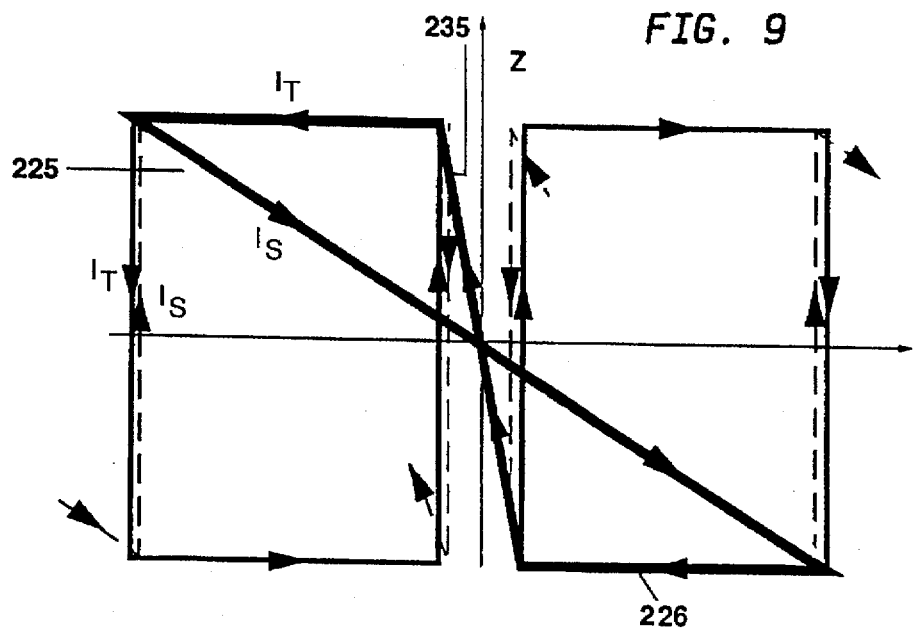

The resulting geometry of the current paths on the toroidal chamber is depicted in the view of FIG. 9. As is apparent from FIG. 5, the current path along the outer electrical conductor 225 is considerably longer than that along the inner conductor 235. As a result, for the situation depicted in FIG. 5 it will be appreciated that loop 226 will have some twist in it. For the situation depicted in FIG. 9 where the loop 226 is shown as running about 180° around the toroidal chamber, the twist is quite evident. The ability to provide current paths with twists is highly desirable for various applications of toroidal magnets. In the present invention, these effects can be achieved in conventional toroidal field coils, which are essentially planar, simply by use of the sawtooth-shaped conductors.

Figure 10:
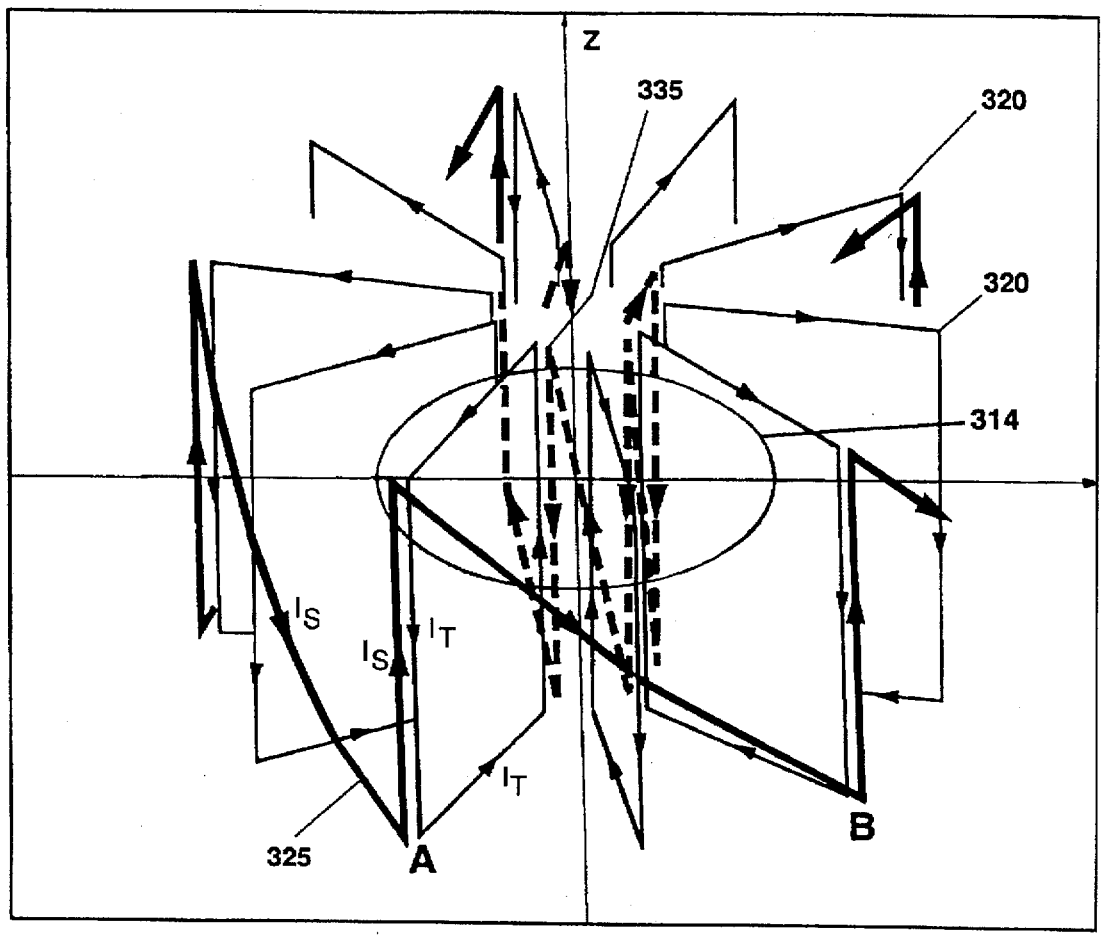
FIG. 10 illustrates a third embodiment of the invention.
Figure 12:
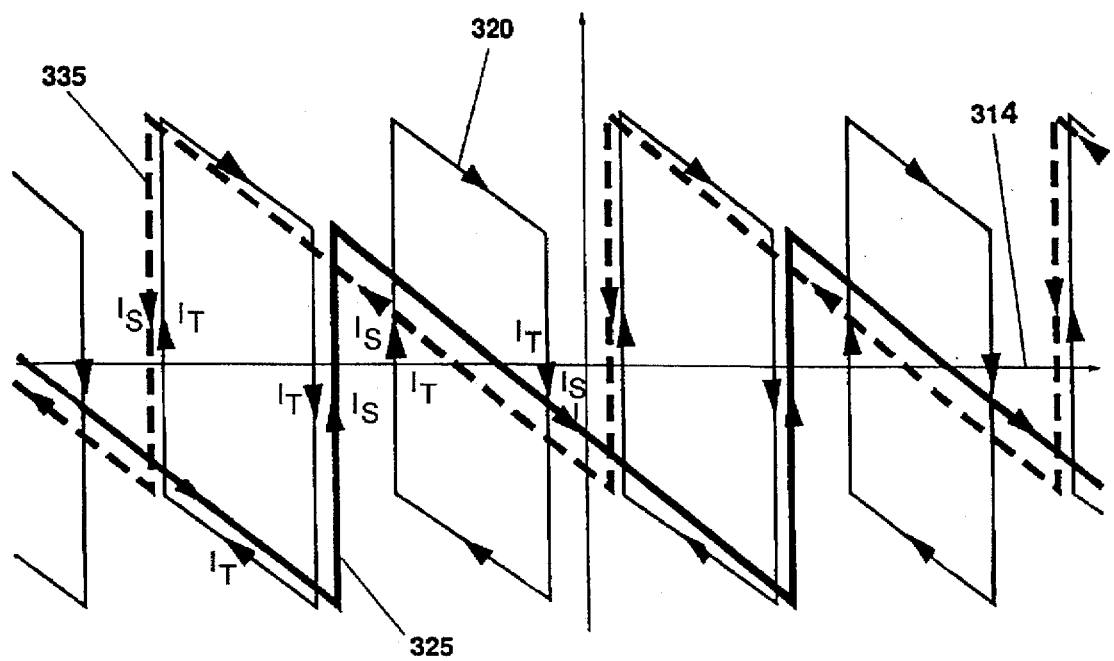

A third embodiment of the invention is similar to the second in construction but in this case the number of teeth in the sawtooth-shaped conductor is a factor of the number of toroidal field coils. For example, as shown in FIG. 10, the vertical portions of the sawtooth may be aligned with every other toroidal field coil. For this embodiment, the shapes of the sawtooth-shaped conductors 325 and 335 (outer and inner) are shown in FIGS. 11A and 11B, respectively. The relationship between the first vertical portion and the second sloping portion of the sawtooth-shaped conductors and the toroidal field coils is depicted in FIG. 12 where the toroidal axis 314 has been transformed to a straight line.

Figure 13:
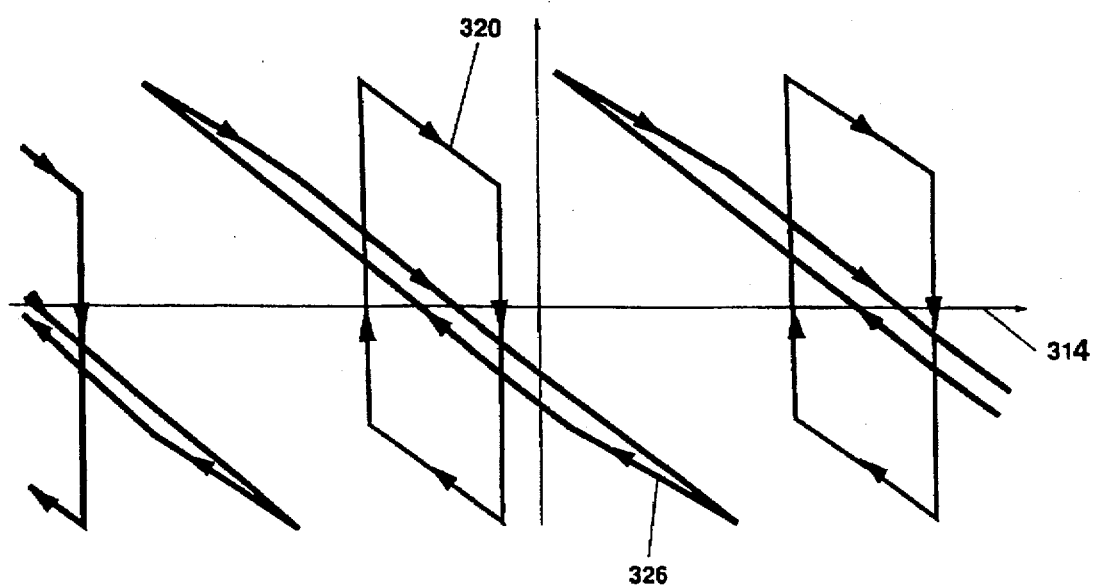

Again, the effect of the current $I_T$ in the vertical edges of the rectangular coils is canceled by equal and opposite currents in the vertical portions of the sawtooth-shaped conductors with the result that the effective current paths are as shown in FIG. 13. Here, it will be seen that every other toroidal field coil is now effectively tilted as indicated by loop 326 and the others remain unchanged as indicated by loop 320.

Figure 14:
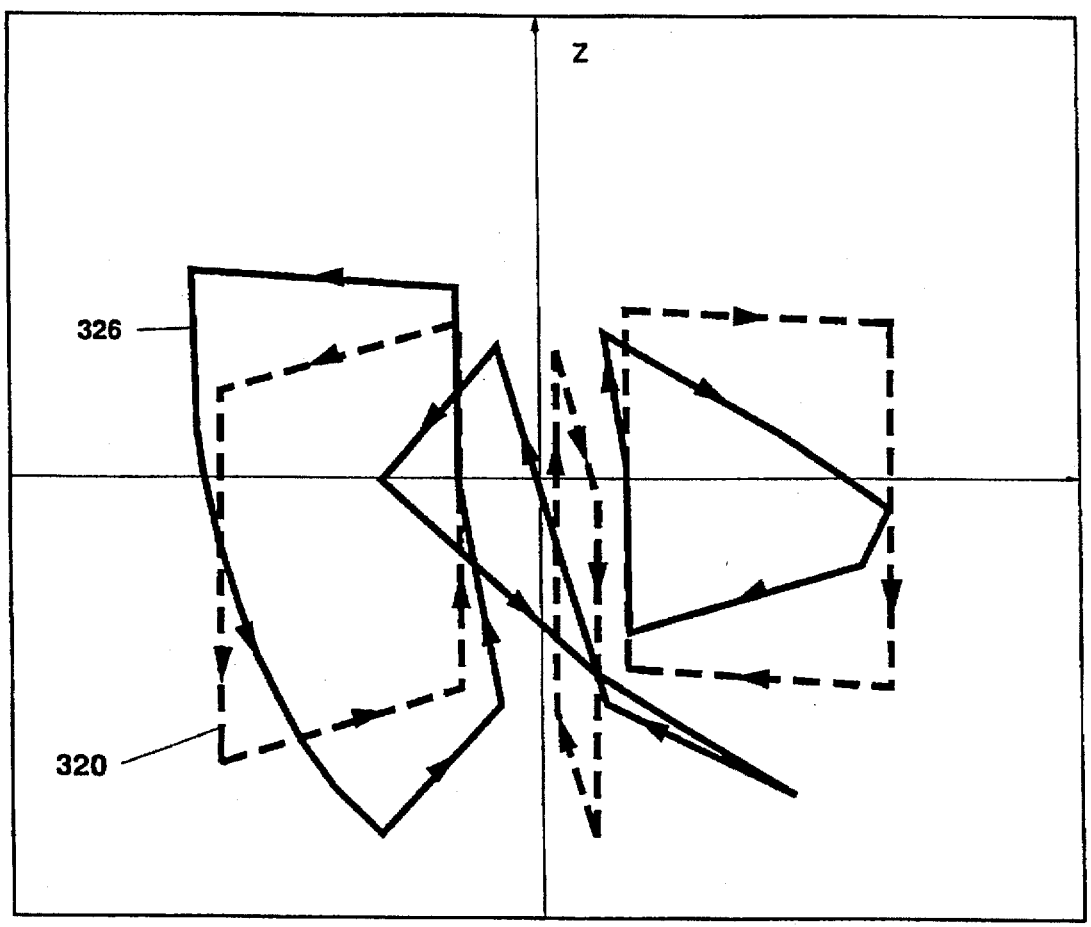

The resulting geometry of the current paths on the toroidal chamber is depicted in the view of FIG. 14. Loops 320 remain rectangular in shape. Loops 326, however, are obviously twisted.

Figure 15:
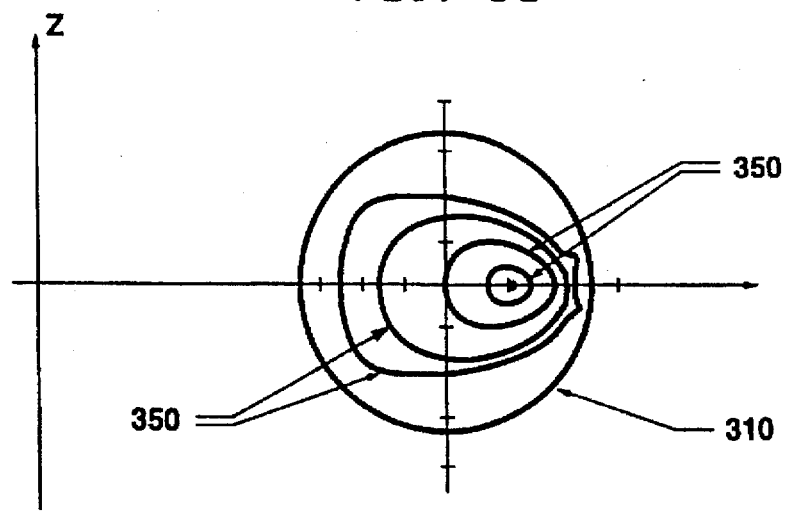
FIG. 15 illustrates the vacuum magnetic surface within the plane of a field coil in the design of FIG. 10.
Figure 16:
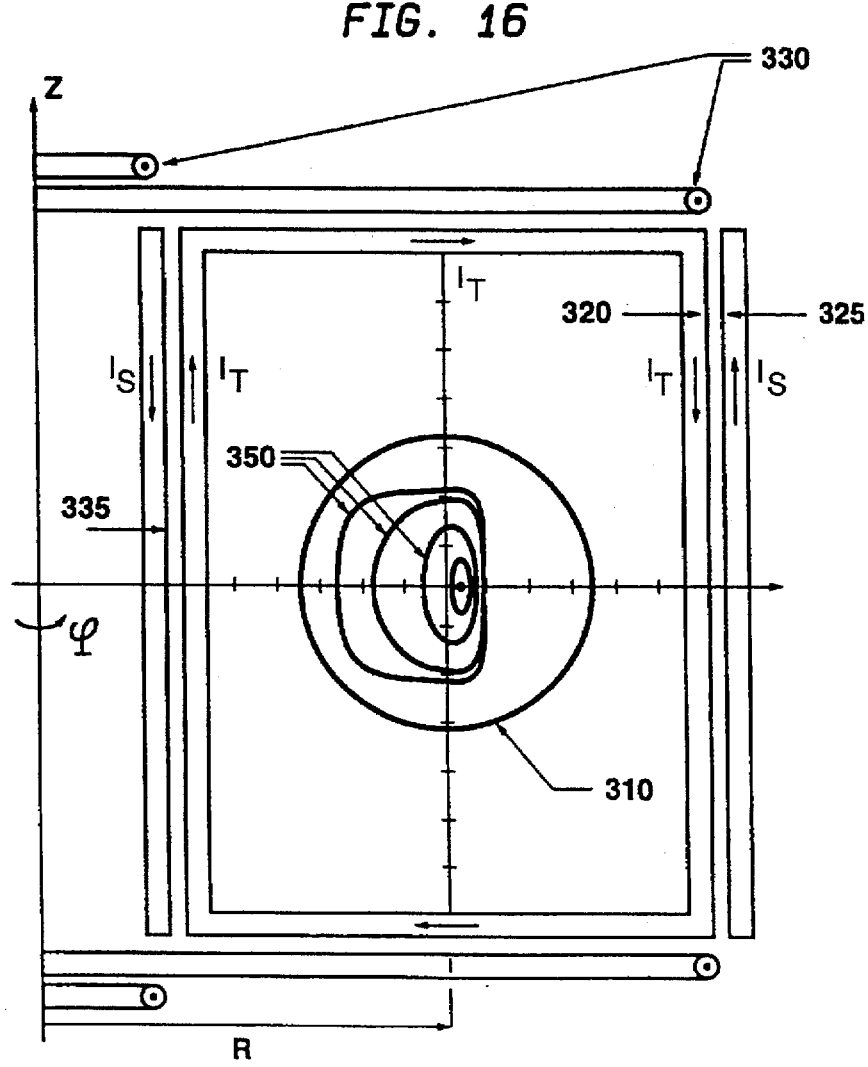
FIG. 16 depicts the vacuum magnetic surface about midway between two successive teeth in the design of FIG. 10.

Mathematical models of the effect of the use of a sawtooth-shaped electrical conductor aligned with the edges of every other field coil as shown in FIG. 10 indicate that it is possible to obtain good control over the magnetic field surfaces within the toroidal chamber. FIG. 15 depicts a plot of the expected magnetic field surfaces 350 within a toroidal chamber 310 that would be observed in the plane of the vertical portions of the sawtooth-shaped windings for the apparatus of FIG. 10 when $I_T$ and $I_S$ are approximately equal and in opposite directions along the inner and outer edges of the toroidal field coil. FIG. 16 depicts a plot of the expected magnetic field surfaces 350 for these same conditions but observed about midway between two successive teeth of the sawtooth-shaped windings, identified by "A" and "B" in FIG. 10.

FIG. 17 depicts a further embodiment of the invention which produces the same effects as the sawtooth-shaped conductor using a pair of triangular-shaped coils 425 and 435 between each toroidal field coil 420. As indicated, the current flow $I_s/2$ in each coil is half that in the embodiments of FIGS. 2, 5 and 10. In one of the triangular coils current flow is clockwise, in the other it is counter-clockwise. As a result, in the vertical portions and the sloping portions of the two triangular coils, current flow is parallel and in the same direction, producing a current path that is the same as that of the current path in the sawtooth-shaped conductor of FIGS. 2, 5 and 10. Thus, the triangular coils of FIG. 17 can be used in place of the sawtooth-shaped continuous electric conductor wherever desired.

As indicated in FIG. 17, there are also current paths along the horizontal portions of the triangular coils. These paths are generally parallel to the direction of the current paths in the poloidal field coils.

FIG. 18 depicts still another embodiment of the invention. This embodiment is the same as that of FIG. 2 but in this case the rectangular toroidal field coils 520 are tilted at an angle to the toroidal axis. For clarity, FIG. 19 depicts several of the tilted field coils and the sawtooth-shaped electric conductor 525 on a toroidal axis 514 that has been transformed into a straight line. FIG. 20 depicts the effective current path 526 for the case where the current $I_T$ in the toroidal field coils 520 is equal in magnitude to the current in electric conductor 525; and FIG. 21 depicts the effective current path 527 for these conditions about the toroidal chamber.

As will be apparent to those skilled in the art, there are numerous alternatives to the practice of my invention. Examples have been presented where the number of teeth in the sawtooth-shaped conductor(s) is the same as the number of toroidal field coils or is a submultiple of the number of toroidal field coils. The invention may also be practiced with a sawtooth-shaped conductor or conductors having a number of teeth that is an integer multiple of the number of field coils. While the invention has been described using rectangular toroidal field coils for purposes of illustration, it will be recognized that it can be practiced using toroidal field coils of other shapes as well. For example, it can be practiced with D-shaped toroidal field coils such as those depicted in FIG. 1 or circular coils. The invention can be practiced with any type of toroidal coil construction, for example, continuous or modular. The particular shape of the counter-current carrying electric conductor can be varied with the type of toroidal field coil and its alignment. In general, it should be substantially parallel to the toroidal field coil over enough of the periphery of the toroidal field coil to produce a discernable effect when the counter-current is applied. Numerous variations in the practice of the invention will be apparent to those skilled in the art.

What is claimed is:

1. A magnet comprising:
    a toroidal chamber having a toroidal axis,
    a plurality of substantially identical toroidal field coils on the toroidal chamber,
    a sawtooth-shaped electric conductor on the toroidal chamber, each tooth of the sawtooth-shaped electric conductor having first and second current conducting portions, the first current conducting portion being substantially parallel to a first portion of one of the toroidal field coils and the second current conducting portion extending from a second portion of one toroidal field coil to an opposite portion of another toroidal field coil so as to provide a continuous electrical path,
    whereby the effects produced by the toroidal field coils within the toroidal chamber can be affected by a current applied to the electric conductor.

2. The magnet of claim 1 wherein each coil intersects the toroidal axis at an angle less than 90 degrees.

3. The magnet of claim 1 wherein each toroidal field coil is perpendicular to the toroidal axis.

4. The magnet of claim 1 wherein each toroidal field coil is substantially circular.

5. The magnet of claim 1 wherein each toroidal field coil is D-shaped.

6. The magnet of claim 1 wherein each toroidal field coil is rectangular.

7. The magnet of claim 1 further comprising at least one means for inducing an electric current within the toroidal chamber.

8. The magnet of claim 7 further comprising at least one poloidal field coil for applying a compensating magnetic field in the toroidal chamber.

9. The magnet of claim 1 wherein each toroidal field coil is substantially planar.

10. The magnet of claim 1 wherein the toroidal field coils are superconducting.

11. The magnet of claim 1 further comprising means for cooling the magnet enough that the toroidal field coils are operating at a temperature of less than 4 degrees Kelvin.

12. The magnet of claim 1 wherein the toroidal field coils are equally spaced around the toroidal chamber.

13. The magnet of claim 1 wherein there are as many teeth in the sawtooth-shaped electric conductor as there are toroidal field coils on the chamber.

14. The magnet of claim 1 wherein the number of teeth in the sawtooth-shaped electric conductor is a factor of the number of toroidal field coils on the chamber.

15. The magnet of claim 1 wherein the sawtooth-shaped electric conductor extends along the outer periphery of the toroidal field coils on the toroidal chamber.

16. The magnet of claim 1 wherein the sawtooth-shaped electric conductor extends along the inner periphery of the toroidal field coils on the toroidal chamber.

17. The magnet of claim 1 comprising two sawtooth-shaped electric conductors, one of which extends along the outer periphery of the toroidal field coils on the toroidal chamber and the other of which extends along the inner periphery of the toroidal field coils on the toroidal chamber.

18. The magnet of claim 17 wherein the number of teeth in each sawtooth-shaped electric conductor is the same factor of the number of toroidal field coils and the first portions of the inner electric conductors are parallel to the same toroidal field coils as the first portions of the outer electric conductors.

19. The magnet of claim 1 whereby, when the current in the toroidal field coils is opposite in direction to the current in the first portions of the sawtooth-shaped electrical conductor, a magnetic effect can be achieved within the toroidal chamber that approximates the magnetic effect that would be created by twisting the field coils of the toroidal chamber.

20. The magnet of claim 1 whereby, when the current in the toroidal field coils is opposite in direction to the current in the first portions of the sawtooth-shaped electrical conductor, a magnetic effect can be achieved within the toroidal chamber that approximates the magnetic effect that would be created by a helical current flow around the toroidal chamber.

21. The magnet of claim 1 wherein the second portion of each tooth of the sawtooth-shaped electric conductor extends from an upper portion of one coil to a lower portion of another coil.

22. A plasma confining magnet in accordance with claim 1.

23. A magnet comprising:
a toroidal chamber having a toroidal axis,
a plurality of substantially identical toroidal field coils on the toroidal chamber, in each of which coils can be established an electric current of substantially the same magnitude that flows in the same direction relative to the toroidal axis, and
at least one electric conductor adjacent at least some of the toroidal field coils for carrying an electric current substantially equal in magnitude to the electric current that flows in a toroidal field coil, said current flowing in a direction so as to cancel out the effect of the current flowing in a portion of at least some of the toroidal field coils.

24. The magnet of claim 23 wherein the toroidal field coils are equally spaced around the toroidal chamber.

25. The magnet of claim 23 wherein the electric conductors adjacent at least some of the toroidal field coils are connected together to form a sawtooth-shaped electric conductor, each tooth of the sawtooth-shaped electric conductor having first and second current conducting portions, the first portion being substantially parallel to a first portion of one of the toroidal field coils and the second portion extending from one toroidal field coil to another toroidal field coil so as to provide a continuous electrical path.

26. The magnet of claim 25 wherein there are as many teeth in the sawtooth-shaped electric conductor as there are toroidal field coils on the chamber.

27. The magnet of claim 25 wherein the number of teeth in the sawtooth-shaped electric conductor is a factor of the number of toroidal field coils on the chamber.

28. The magnet of claim 25 wherein the sawtooth-shaped electric conductor extends along the outer periphery of the toroidal field coils on the toroidal chamber.

29. The magnet of claim 25 wherein the sawtooth-shaped electric conductor extends along the inner periphery of the toroidal field coils on the toroidal chamber.

30. The magnet of claim 25 comprising two sawtooth-shaped electric conductors, one of which extends along the outer periphery of the toroidal field coils on the toroidal chamber and the other of which extends along the inner periphery of the toroidal field coils on the toroidal chamber.

31. The magnet of claim 30 wherein the number of teeth in each sawtooth-shaped electric conductor is the same factor of the number of toroidal field coils and the first portions of the inner electric conductors are parallel to the same toroidal field coils as the first portions of the outer electric conductors.

32. The magnet of claim 25 whereby, when the current in the toroidal field coils is opposite in direction to the current in the first portions of the sawtooth-shaped electrical conductor, a magnetic effect can be achieved within the toroidal chamber that approximates the magnetic effect that would be created by a helical current flow around the toroidal chamber.

33. The magnet of claim 25 whereby, when the current in the toroidal field coils is opposite in direction to the current in the first portions of the sawtooth-shaped electrical conductor, a magnetic effect can be achieved within the toroidal chamber that approximates the magnetic effect that would be created by twisting the toroidal field coils about the toroidal chamber.

34. A plasma confining magnet in accordance with claim 23.

35. In a magnet having a toroidal chamber with a toroidal axis and a plurality of substantially identical magnetic coils on the toroidal chamber, a method of operating the magnet comprising the steps of:
establishing in each coil an electric current of substantially the same magnitude that flows in the same direction relative to the toroidal axis, and
establishing in at least one electric conductor adjacent the toroidal field coils an electric current substantially equal in magnitude to the electric current that flows in a toroidal field coil, said current flowing in a direction so as to cancel out the effect of the current flowing in a portion of at least some of the toroidal field coils while providing a current path between those toroidal field coil portions in which the current is canceled out.

36. The method of claim 35 wherein the electric conductor comprises a sawtooth-shaped electric conductor, each tooth of the sawtooth-shaped electric conductor having first and second current conducting portions, the first portion being adjacent to a first portion of one of the toroidal field coils and the second portion extending from a second portion of one coil to an opposite portion of another toroidal field coil so as to provide a continuous electrical path.

37. The method of claim 36 wherein there are as many teeth in the sawtooth-shaped electric conductor as there are toroidal field coils on the chamber.

38. The method of claim 36 wherein the number of teeth in the sawtooth-shaped electric conductor is a factor of the number of toroidal field coils on the chamber.

39. The method of claim 36 wherein the sawtooth-shaped electric conductor extends along the outer periphery of the toroidal field coils on the toroidal chamber.

40. The method of claim 36 wherein the sawtooth-shaped electric conductor extends along the inner periphery of the toroidal field coils on the toroidal chamber.

41. The method of claim 36 comprising two sawtooth-shaped electric conductors, one of which extends along the outer periphery of the toroidal field coils on the toroidal chamber and the other of which extends along the inner periphery of the toroidal field coils on the toroidal chamber.

42. The method of claim 41 wherein the number of teeth in each sawtooth-shaped electric conductor is the same factor of the number of toroidal field coils and the first portions of the inner electric conductors are adjacent to the same toroidal field coils as the first portions of the outer electric conductors.

43. The magnet of claim 36 whereby, when the current in the toroidal field coils is opposite in direction to the current in the first portions of the sawtooth-shaped electrical conductor, a magnetic effect can be achieved within the toroidal chamber that approximates the magnetic effect that would be created by a helical current flow around the toroidal chamber.

44. The magnet of claim 36 whereby, when the current in the toroidal field coils is opposite in direction to the current in the first portions of the sawtooth-shaped electrical conductor, a magnetic effect can be achieved within the toroidal chamber that approximates the magnetic effect that would be created by twisting the toroidal field coils about the toroidal chamber.

* * * * *